(12) United States Patent
Dezonno

(10) Patent No.: US 8,539,034 B2
(45) Date of Patent: Sep. 17, 2013

(54) SYSTEM AND METHOD FOR BULK DATA MESSAGING

(75) Inventor: Anthony J. Dezonno, Bloomingdale, IL (US)

(73) Assignee: Aspect Software, Inc., Chelmsford, MA (US)

( * ) Notice: Subject to any disclaimer, the term of this patent is extended or adjusted under 35 U.S.C. 154(b) by 1251 days.

(21) Appl. No.: 10/902,451

(22) Filed: Jul. 29, 2004

(65) Prior Publication Data

US 2006/0026241 A1 Feb. 2, 2006

(51) Int. Cl.
 *G06F 15/16* (2006.01)

(52) U.S. Cl.
 USPC ........................................ 709/207

(58) Field of Classification Search
 USPC ................................. 709/206, 207
 See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,282,284 B1 | 8/2001 | Dezonno et al. | 379/265 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,563,921 B1 | 5/2003 | Williams et al. | 379/266.01 |
| 6,732,156 B2 | 5/2004 | Miloslavsky | |
| 6,981,223 B2 * | 12/2005 | Becker et al. | 715/753 |
| 7,047,309 B2 * | 5/2006 | Baumann et al. | 709/232 |
| 7,124,123 B1 * | 10/2006 | Roskind et al. | 706/60 |
| 2004/0153473 A1 * | 8/2004 | Hutchinson et al. | 707/104.1 |
| 2004/0153504 A1 * | 8/2004 | Hutchinson et al. | 709/204 |

FOREIGN PATENT DOCUMENTS

EP 1424844 A1 * 6/2004

* cited by examiner

*Primary Examiner* — Ryan Jakovac
(74) *Attorney, Agent, or Firm* — Husch Blackwell LLP

(57) ABSTRACT

A system and method can broadcast a plurality of instant messages, at substantially the same time, via a computer network to a plurality of recipients. The recipients can respond via the network to a human or an automated agent. A predetermined reply message can be sent if all agents are busy.

24 Claims, 2 Drawing Sheets

SYSTEM AND METHOD FOR BULK DATA MESSAGING

FIELD OF THE INVENTION

The invention pertains to computer network based messaging systems. More particularly, the invention pertains to such systems which carry out bulk data-type message broadcasting and which couple responses thereto to agents for follow up.

BACKGROUND OF THE INVENTION

Messages can be sent, via computer networks, such as the world-wide web from a transmitting source, to one or more recipients. One form of messaging is E-mail. In this one-to-many form of communication a recipient can respond not only to the sender but also at substantially the same time to all other recipients identified on that particular message. Conventional E-mail systems provide a queue for incoming messages. A user can access the messages and respond to same at his/her convenience. Other parties to whom the message was addressed, or who were copied on the message can communicate with the sender and also with each other. Where one sender has communicated with numerous individuals, that sender would receive all responses at his/her queue for further processing. Depending on the circumstances, an unacceptably long time might elapse before the sender could address all of the responses.

Instant messaging systems provide a desirable alternate to conventional E-mail systems. With instant messaging, one party that has logged onto the computer network such as the Internet can send a message directly to another party who is also on-line. The two parties can communicate bi-directionally without using their respective E-mail systems and associated queues. Public instant message systems are available from a variety of sources.

The known instant message systems, however, faulted when attempting to send messages to a large group of users or among large members of a list. More so, these solutions required the importation of names into something similar to an address book in order to effectively communicate with a user and that may not always be desired due to limitations in the numbers of addresses that may be stored in an address book.

SUMMARY OF THE INVENTION

In a method in accordance with the invention, a target group of recipients is established. A substantially common message is established to be transmitted via a computer network to at least an on-line portion of the target group. The common message is transmitted via the network to the one-line portion of the target group. Available bandwidth is monitored while transmitting.

Further, previous solutions used methods that required messages to be sent in a singular fashion to each user and required a return message prior to being able to communicate with additional users. As such, relatively few users that could be contacted during a period of time.

Thus, there continues to be a need for systems that can not only transmit a common message to numerous recipients, but also can respond in a relatively timely fashion to a large number of replies thereto. Preferably, in connection with a commercial transmission, all replies will be directed to an agent.

DETAILED DESCRIPTION OF THE EMBODIMENTS

Figure 1:
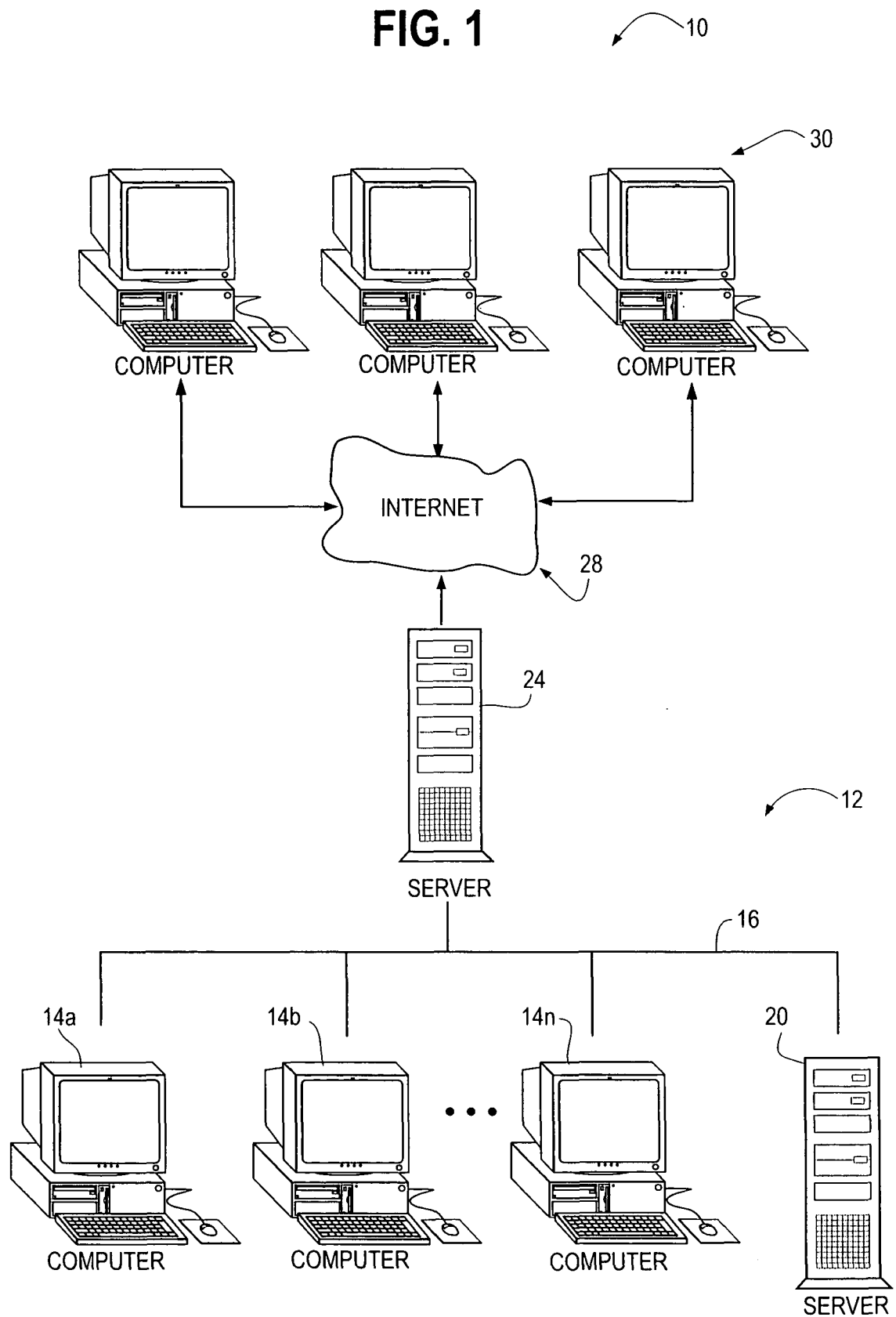
FIG. 1 is a system in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode, and is not intended to limit the invention to the specific embodiment illustrated.

A system which embodies the invention is effective in sending messages directed to large groups of intended recipients. Facilities are provided to transfer larger numerous responses to human or automated agents.

Users are typically limited by the service provider to communicating messages only a maximum amount of bandwidth through the communications channel. It is desirable that the maximum bandwidth is achieved for communicating out the channel by first determining whether a user is online prior to sending out an instant message, and then adjusting a preset counter that is programmed to calculate the amount of data channel bandwidth that has been used during a period of time to achieve maximum data bandwidth.

Upon receipt of a directed reply to the broadcasted message from a user, an agent recipient, either automated or human, can be selected to communicate to the user. This can be done in a proxy fashion wherein; the agent is selected from a group of agents connected to the proxy and a direct connection is established between the agent computer and the user through the server. It is also possible to connect the agent directly to the user bypassing the server. It is desirable that a human agent is first connected, then an automated agent, and finally a data message showing that all contact points are presently busy. If neither type of agent is available, the system can still respond to the recipient by seeking to schedule a time or day and time when an agent can respond to the recipients.

FIG. 1 illustrates a system 10 in accordance with the invention. System 10 includes a bulk message initiating facility 12 which could include a plurality of human agents who could respond to replies via respective computers 14a, b . . . n. The computers 14a, b . . . n communicate via an intranet, indicated generally at 16 with a local server 20.

Server 20 could also implement a plurality of software or machine based agents. Server could also generate a reply message generation in the event that none of the agents is available. System 12 communicates via an Internet Service Provider and server 24 via the Internet indicated generally at 28 with a plurality of potential recipients 30.

Either server 20 or server 24 can incorporate bulk message generation software for purposes of sending an instant message to a plurality of potential recipients 30. Preferably, the transmitting server, such as server 24 will initially communicate with the respective potential recipient to establish whether or not the recipient is online. If not online, the respective potential recipient will be placed into a separate queue for subsequent follow-up when online.

To further improve transmission efficiency, the server 24 can maintain and adjust a preset counter that has been programmed to calculate the amount of channel bandwidth that has been used during a period of time so as to attempt to achieve maximum data bandwidth.

One or more recipients of the plurality 30 who has received the subject instant message (which could be a solicitation for example, or an advertisement for a service or a product) might be interested in replying, also using the same instant messaging context, to the transmitting facility 12. It is known that when a reply to a solicitation or an advertisement has been received, it is important to carry out the communication with the replying party essentially immediately if at all possible. In this regard, upon receiving a reply from one of the recipients in the plurality 30, an agent either human or automated, could be selected to carry out the necessary communication with that recipient. Selection software can be stored and executed by server 20.

In a preferred embodiment of the invention, an available human agent using one of the computers 14a, b . . . n can be selected and communication can be established between the selected agent's computer and the recipient through server 24. Alternately, the selected agent could be directly connected to the recipient bypassing the server.

Procedurally it would be preferred to have a human agent placed in communication with the recipient as a first choice. In the event all of the agents and their computers 14a, 14b . . . n are busy or unavailable, then an automated agent implemented by server 20, for example, could be placed in communication with the recipient. While the automated agent might not have the versatility and capabilities of a human agent, nevertheless, it would be preferable to implement the communication with the recipient at that time even if the capabilities of the automated agents are less than those of a human agent. Finally, if neither human agent nor automated agent is available, server 20 can respond with one or more preestablished messages suggesting scheduling another time, or day and time, when an agent could be placed in communication with the recipient to carry out the transaction.

It will be understood that the system described above could be implemented in a variety of alternative fashions without departing from the spirit and scope of the present invention.

Figure 2A:
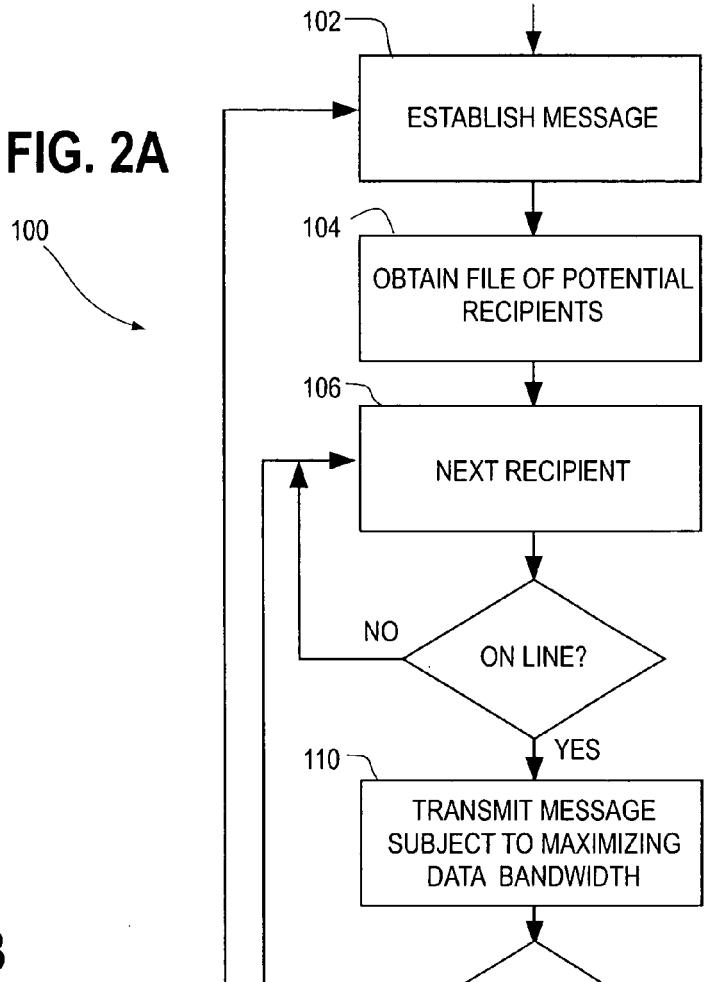
FIGS. 2A, B together illustrate a method in accordance with the invention.
Figure 2B:
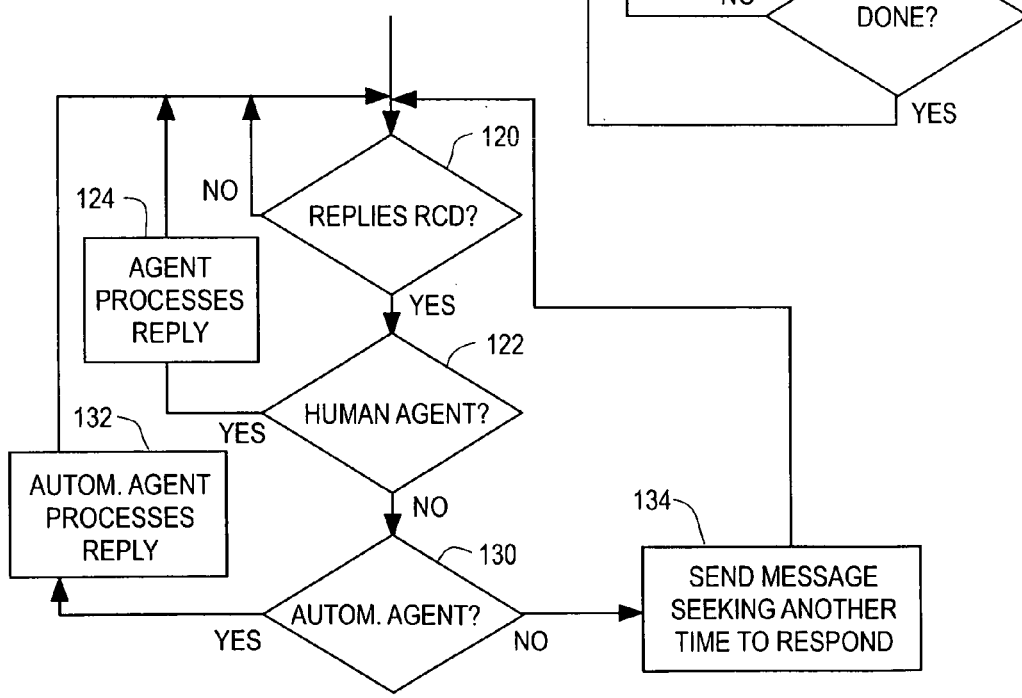

FIGS. 2A and 2B, taken together, illustrate steps of a method in accordance with the invention. A message of interest is first established, step 102. A file or a list of potential recipients is obtained or established, step 104. The next recipient is obtained from the file or list, step 106. If the potential recipient is on-line, the message is transmitted subject to maximizing data bandwidth, step 110. If not, the recipient's identification information can be placed in a queue for later follow-up. If messages have been transmitted to the on-line potential recipients, the process can be repeated with a different message and with a different file of potential recipients. Relative to FIG. 2B, as replies are received, step 120, the availability of a human agent to respond thereto is determined, step 122. If a human agent is available the response is forwarded thereto and the agent processes the reply, step 124. If a human agent is not available, the reply is forwarded to an automated agent for processing. If an automated agent is available the reply will be processed, step 132.

In the event that an automated agent is not available, a prestored message can be forwarded to the recipient, step 134, attempting to establish another time, or day and time, at which an agent could contact the recipient for follow-up. The process will continue until the replies have all been processed.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method comprising:
   establishing a target group of a plurality of recipients;
   establishing a substantially common message to be transmitted via a computer network to at least an on-line portion of the target group;
   determining which members of the target group are on-line by initially communicating to each respective member of the target group prior to sending an instant message to the respective member and placing into a queue identification information but not the message of each of those respective members of the target group not found to be on-line; and
   transmitting sequentially the common message as an instant message by bulk message broadcast via the computer network only to each respective on-line member of the target group upon determining that the respective member is on-line, including monitoring available bandwidth while transmitting to maximize use of data bandwidth by adjusting for each message transmission a preset counter programmed to calculate an amount of data bandwidth that has been used during a period and used to determine whether to transmit each message; and
   receiving an instant message response from a recipient of the common instant message, attempting to select a human agent and forwarding the response to a selected human agent if a human agent is available, and establishing a communication between the agent and the recipient, and if no human agent is available, attempting to select an automated agent and then forwarding a prestored message to the recipient if no automated agent is available.

2. A method as in claim 1 further comprising essentially immediately communicating with a recipient of the common instant message in response to receiving an instant message response from the recipient.

3. A method as in claim 1 which includes sensing the instant message response received from a recipient of the common instant message.

4. A method as in claim 3 which includes forwarding the response to the agent selected from a group of agents connected to a proxy and establishing a direct connection between the agent and the recipient through a server.

5. A method as in claim 3 which includes determining availability of an agent and directly connecting the recipient to the agent without connecting through a proxy server.

6. A method as in claim 4 further comprising transmitting the common message as a bulk message broadcast through a bulk message via an Internet Service Provider initiating facility.

7. A method as in claim 4 which includes attempting to establish a subsequent time to contact the recipient for follow up if no agent is available.

8. A method as in claim 1 which includes sending one or more pre-established messages suggesting scheduling another time when an agent can be placed in communication with the recipient after determining that no human or automated agent is available.

9. A computer readable storage medium storing software, the software comprising:
   first software for obtaining a plurality of identifiers of a plurality of potential recipients;
   second software for retrieving a predetermined common message to be transmitted via a computer network to at least an on-line portion of the potential recipients;
   third software for determining that one or more of the plurality of potential recipients has logged onto a computer network by initially communicating to each respective potential recipient prior to sending an instant message to the respective recipient, and placing into a queue the identifiers but not the common message of those potential recipients that have not logged on;

fourth software for transmitting sequentially the common message as a bulk instant message broadcast only to those potential recipients that have logged onto the network and for monitoring available bandwidth while transmitting to maximize use of data bandwidth by adjusting for each message transmitted a preset counter programmed to calculate data bandwidth that has been used to determine whether to transmit each message; and fifth software to attempt to assign an human agent to process an instant message reply received from a recipient if a human agent is available and establish communication between the agent and the recipient, and if no human agent is available, to attempt to select an automated agent and then forward a pre-stored message to the recipient if no automated agent is available.

10. A computer readable storage medium as in claim 9 which includes software for establishing if a human agent is available to process the reply.

11. A computer readable storage medium as in claim 9 which includes software for establishing if a computer based agent is available to process the reply.

12. A computer readable storage medium as in claim 9 which includes software for forwarding a pre-established message suggesting another time to communicate in response to a reply where neither a human nor a computer based agent are available.

13. A computer readable storage medium as in claim 10 which includes software to forward the reply over the computer network to an individual human agent for processing and to establish a direct connection between the agent and the recipient.

14. A computer readable storage medium as in claim 11 which includes software to forward the reply to an available computer based agent for processing in the absence of a human agent.

15. A computer readable storage medium as in claim 10 which includes control software to maximize data bandwidth during message transmission.

16. A computer readable storage medium as in claim 15 which includes software for establishing if a computer based agent is available to process the reply; and which includes software for forwarding a message in response to a reply where neither a human nor a computer based agent are available.

17. A computer readable storage medium as in claim 13 which includes software to forward the reply to an available computer based agent for processing in the absence of a human agent.

18. A computer readable storage medium as in claim 9 which includes software to adjust a preset counter and calculate available bandwidth.

19. A bulk message broadcasting system comprising;
at least one processor for executing pre-stored software;
a local area communications network;
a plurality of human agent computers, the computers and the processor communicate via the network;
software executable by the processor for implementing a plurality of computer based agents;
software for determining which ones of a plurality of potential recipients of a common message are on-line recipients by initially communicating from the processor to each respective potential recipient prior to sending an instant message to the respective recipient and for placing identification information, but not the message, of any potential recipients that are not on-line into a queue;
software for forwarding sequentially, via a computer network, the common message as an instant message by bulk message broadcast only to each of a plurality of on-line recipients individually as they are determined to be on-line, seeking a respective response therefrom, and for monitoring available bandwidth while transmitting to maximize use of data bandwidth by adjusting for each message forwarded a preset counter programmed to calculate data bandwidth that has been used, to determine whether to transmit each message; and
software for receiving at least one reply from an on-line recipient in response to a respective instant message, and if a human agent is available, for selecting a human agent and forwarding the reply to the selected human agent for processing and establishing a communication between the human agent and the recipient, and if no human agent is available, attempting to select an automated agent, and forwarding a pre-stored message to the recipient if no automated agent is available.

20. A system as in claim 19 which includes software for identifying a plurality of potential recipients.

21. A system as in claim 20 which includes software for establishing content of the message.

22. A system as in claim 20 which includes software for forwarding the reply to an available computer based agent in the event that a human agent is not available.

23. A system as in claim 22 which includes software for forwarding a message in response to a respective reply, that neither human nor computer based agents are available.

24. A system as in claim 23 which includes software to establish a contact time when the recipient would be available for a follow-up communication.

\* \* \* \* \*